United States Patent
Rechert et al.

(10) Patent No.: US 10,339,529 B2
(45) Date of Patent: Jul. 2, 2019

(54) RULES ENGINE FOR APPLYING RULES FROM A REVIEWING NETWORK TO SIGNALS FROM AN ORIGINATING NETWORK

(71) Applicant: MasterCard International Incorporated, Purchase, NY (US)

(72) Inventors: Mary K. Rechert, O'Fallon, MO (US); Archie G. Counts, O'Fallon, MO (US); Timothy Glen Althoff, O'Fallon, MO (US); Janice C. Mehanovic, Affton, MO (US)

(73) Assignee: MASTERCARD INTERNATIOINAL INCORPORATED, Purchase, NY (US)

( * ) Notice: Subject to any disclaimer, the term of this patent is extended or adjusted under 35 U.S.C. 154(b) by 763 days.

(21) Appl. No.: 14/944,958

(22) Filed: Nov. 18, 2015

(65) Prior Publication Data

US 2017/0140377 A1     May 18, 2017

(51) Int. Cl.
| | | |
|---|---|---|
| *G06Q 20/40* | (2012.01) | |
| *G06Q 20/02* | (2012.01) | |
| *G06Q 20/10* | (2012.01) | |

(52) U.S. Cl.
CPC ......... *G06Q 20/405* (2013.01); *G06Q 20/023* (2013.01); *G06Q 20/108* (2013.01)

(58) Field of Classification Search
CPC ............. G06Q 20/108; G06Q 20/4097; G06Q 20/023; G06Q 20/405
See application file for complete search history.

(56) References Cited

U.S. PATENT DOCUMENTS 6,408,284 B1 * 6/2002 Hilt ........................ G06Q 20/02
                                                                            705/40
7,617,152 B2    11/2009 Chai et al.
(Continued)

FOREIGN PATENT DOCUMENTS

| RU | 2285293 C2 | 10/2006 | |
|---|---|---|---|
| WO | WO-9512859 A1 * | 5/1995 | ............. G06Q 20/02 |

OTHER PUBLICATIONS

Chargerback911: MasterCard and Visa Chargeback Reason Codes, Mar. 11, 2015, Web archives, pp. 1-22. (Year: 2015).*

(Continued)

*Primary Examiner* — Bijendra K Shrestha
(74) *Attorney, Agent, or Firm* — Armstrong Teasdale LLP

(57) ABSTRACT

A rules engine for applying rules from a reviewing network to data signals from an originating network is described. The rules engine includes a processor coupled to a memory device. The rules engine is coupled to the reviewing network, and is configured to receive a clearing data signal from the originating network. The clearing data signal includes clearing data for at least one transaction that has been processed by the originating network. The originating network and the reviewing network are payment networks. Additionally, the rules engine generates a clearing response data signal that includes clearing response data by comparing the clearing data to the set of predefined rules stored in the memory device. The clearing response data indicates that the reviewing network will not guarantee settlement of at least one transaction included in the clearing data. The rules engine transmits the clearing response data signal to the originating network.

18 Claims, 10 Drawing Sheets

(56) References Cited

U.S. PATENT DOCUMENTS

| | | | |
|---|---|---|---|
| 8,086,539 B2 | 12/2011 | Nauman et al. | |
| 2002/0111919 A1* | 8/2002 | Weller | G06Q 20/02 |
| | | | 705/67 |
| 2003/0101134 A1* | 5/2003 | Liu | G06Q 20/04 |
| | | | 705/39 |
| 2003/0191875 A1* | 10/2003 | Nguyen | G06F 9/466 |
| | | | 710/58 |
| 2004/0167854 A1* | 8/2004 | Knowles | G06Q 20/105 |
| | | | 705/41 |
| 2005/0044043 A1* | 2/2005 | Gooding | G06Q 20/108 |
| | | | 705/42 |
| 2006/0004670 A1* | 1/2006 | McKenney | G06Q 20/02 |
| | | | 705/64 |
| 2008/0189210 A1* | 8/2008 | Sawhney | G06Q 20/28 |
| | | | 705/44 |
| 2009/0119209 A1 | 5/2009 | Sorensen et al. | |
| 2009/0171839 A1* | 7/2009 | Rosano | G06Q 20/102 |
| | | | 705/40 |
| 2011/0153478 A1 | 6/2011 | McKay et al. | |
| 2012/0131190 A1 | 5/2012 | Nauman et al. | |
| 2012/0265683 A1* | 10/2012 | da Silva | G06Q 20/00 |
| | | | 705/44 |
| 2012/0303525 A1* | 11/2012 | Sahadevan | G06Q 20/405 |
| | | | 705/44 |
| 2014/0195984 A1* | 7/2014 | Aslam | G06Q 50/265 |
| | | | 715/853 |
| 2015/0193743 A1* | 7/2015 | Simmons | G06Q 20/023 |
| | | | 705/39 |
| 2015/0242854 A1* | 8/2015 | Hayhow | G06Q 20/027 |
| | | | 705/44 |

OTHER PUBLICATIONS

Chargeback911: MasterCard and Visa Chargeback Reason Codes, Mar. 11, 2015, pp. 1-22 (Year: 2015).*

Bank for International Settlements: Delivery versus Payment in Securities Settlement Systems, Sep. 1992 (Year: 1992).*

Bech et al.:Settlement Liquidity and Monetary Policy Implementation—Lesson from the Financial Crisis, Mar. 2012, FRBNY Economic Policy Review, pp. 1-25. (Year: 2012).*

Kahn et al.: The Design of Wholesale Payment Networks: The Importance of Incentives, 1999, Federal Reserve Bank of Atlanta, 1999, pp. 1-10 (Year: 1999).*

PCT Search Report and Written Opinion, Application No. PCT/US 2016/061567, dated Mar. 30, 2017, 7 pps.

Анатомия транзакции -О картах без секретов (Anatomy of Transactions—On Maps Without Secrets), Mar. 18, 2011 [PDF printed Apr. 21, 2017], 6 pps., < http:mnikandrov.livejournal.com/952.html >.

* cited by examiner

RULES ENGINE FOR APPLYING RULES FROM A REVIEWING NETWORK TO SIGNALS FROM AN ORIGINATING NETWORK

BACKGROUND

This disclosure relates to processing electronic signals transmitted through computer networks, and more specifically to detecting data in signals received from an originating data network and determining whether aspects of the data comply with rules stored in an electronic database at a reviewing network.

At least some known payment networks perform a payment authorization process, followed by a clearing process, and a settlement process. More specifically, the payment authorization process, clearing process, and settlement process are performed within the same payment network, rather than being distributed across multiple payment networks. Accordingly, if a first payment network is restricted from performing a subset of the payment authorization, clearing, and settlement processes within a certain jurisdiction, for certain types of transactions, and/or for certain parties to the transactions, for example due to governmental restrictions, the first payment network is unable to delegate the processes to a second payment network that is not subject to the same restrictions.

BRIEF DESCRIPTION OF THE DISCLOSURE

In one aspect, a rules engine for applying rules from a reviewing network to data signals from an originating network is provided. The rules engine includes a processor coupled to a memory device. The rules engine is coupled to the reviewing network. The rules engine is configured to receive a clearing data signal from the originating network. The clearing data signal includes clearing data for at least one transaction that has been processed by the originating network. The originating network and the reviewing network are payment networks. Additionally, the rules engine generates a clearing response data signal that includes clearing response data by comparing the clearing data to the set of predefined rules stored in the memory device. The clearing response data indicates that the reviewing network will not guarantee settlement of at least one transaction included in the clearing data. Additionally, the rules engine transmits the clearing response data signal to the originating network.

In another aspect, a method for applying rules from a reviewing network to data signals from an originating network is provided. The method is implemented by a rules engine including a processor coupled to a memory device and to a payment network. The method includes receiving, by the rules engine, a clearing data signal from the originating network. The clearing data signal includes clearing data for at least one transaction that has been processed by the originating network. The originating network and the reviewing network are payment networks. The method additionally includes generating, by the rules engine, a clearing response data signal that includes clearing response data by comparing the clearing data to the set of predefined rules stored in the memory device. The clearing response data indicates that the reviewing network will not guarantee settlement of at least one transaction included in the clearing data. The method also includes transmitting, by the rules engine, the clearing response data signal to the originating network.

In yet another aspect, a computer-readable storage medium having computer-executable instructions embodied thereon for applying rules from a reviewing network to data signals from an originating network. When executed by a rules engine including a processor coupled to a memory device and to a processing network, the computer-executable instructions cause the rules engine to receive a clearing data signal from the originating network. The clearing data signal includes clearing data for at least one transaction that has been processed by the originating network. The originating network and the reviewing network are payment networks. Additionally, the instructions cause the rules engine to generate a clearing response data signal that includes clearing response data by comparing the clearing data to the set of predefined rules stored in the memory device. The clearing response data indicates that the reviewing network will not guarantee settlement of at least one transaction included in the clearing data. Additionally, the instructions cause the rules engine to transmit the clearing response data signal to the originating network.

BRIEF DESCRIPTION OF THE DRAWINGS

FIG. 1 is a schematic diagram illustrating an enhanced multi-party payment card industry system for enabling payment-by-card transactions in which merchants and card issuers do not necessarily have a one-to-one relationship in a first payment processing network, and for receiving and analyzing electronic signals transmitted from a second payment processing network.

FIG. 2 is a simplified block diagram of an example payment processing system including a payment processing server computing device of a first payment processing network, a rules engine, a computing device of a second payment processing network, and a plurality of other client computing devices in accordance with one example embodiment of the present disclosure.

FIG. 3 is an expanded block diagram of a server architecture of the first payment processing system including the plurality of computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a diagram of electronic data signals received and transmitted among the first payment processing network, the second payment processing network, and the rules engine.

FIG. 7 is a diagram of rules that the rules engine applies to transaction data included in clearing data from the second payment processing network.

FIG. 8 is a diagram of clearing response data transmitted from the rules engine to the second payment processing network.

FIG. 9 is a flowchart of an example process implemented by the rules engine for applying rules from the first payment processing network to data signals from the second payment processing network in one example embodiment of the present disclosure.

FIG. 10 is a diagram of components of one or more example computing devices that may be used in the system shown in FIG. 2.

DETAILED DESCRIPTION OF THE DISCLOSURE

Figure 1:
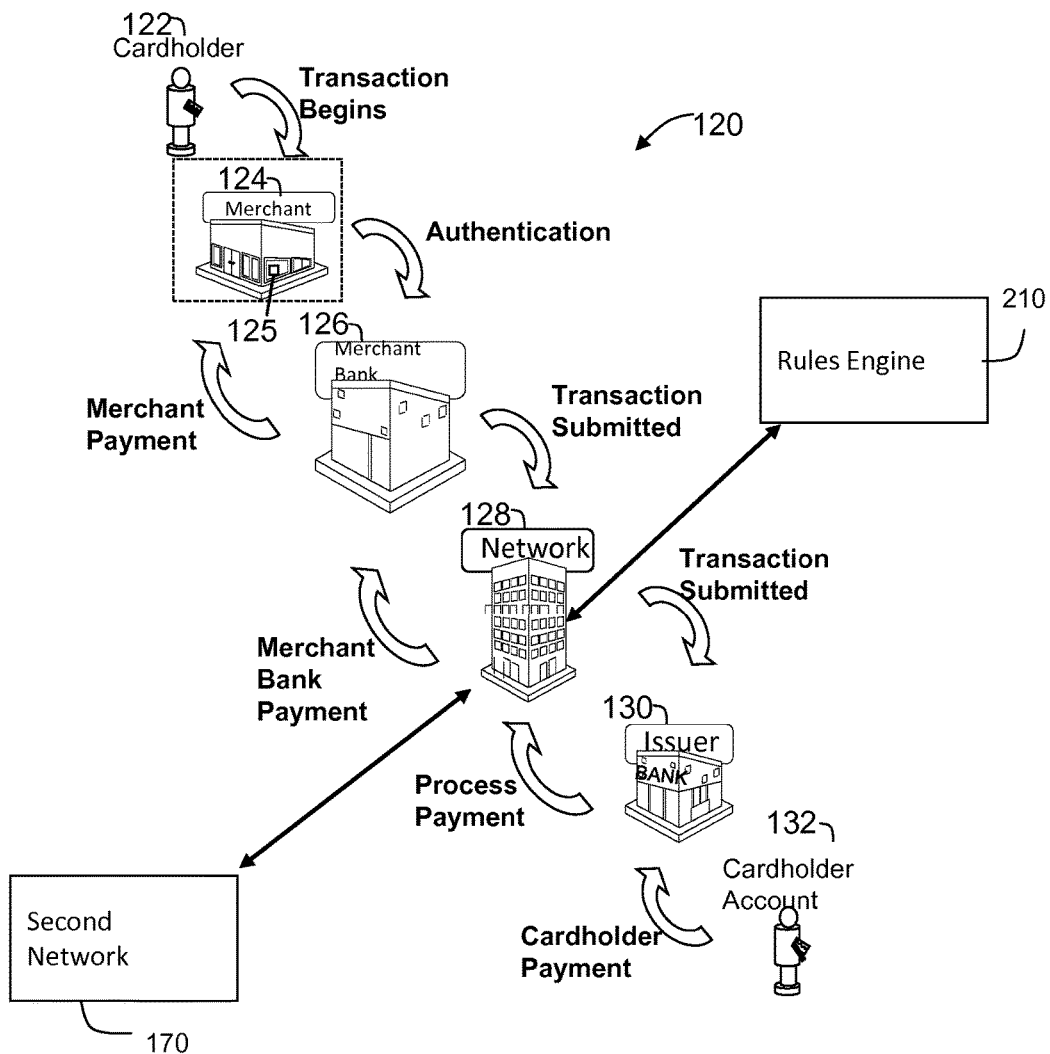
FIGS. 1-10 show example embodiments of the methods and systems described herein.

A rules engine for applying rules from a reviewing network to data signals from an originating network is provided. The rules engine includes a processor coupled to a memory device. The rules engine is coupled to the reviewing network. The rules engine is configured to receive a clearing data signal from the originating network. The clearing data signal includes clearing data for at least one transaction that has been processed by the originating network. In at least some implementations, the originating network and the reviewing network are payment networks as described in more detail herein. Additionally, the rules engine generates a clearing response data signal that includes clearing response data by comparing the clearing data to the set of predefined rules stored in the memory device. The clearing response data indicates that the reviewing network will not guarantee settlement of at least one transaction included in the clearing data. Additionally, the rules engine transmits the clearing response data signal to the originating network.

If the reviewing network (i.e., a first payment processing network) guarantees settlement for a transaction, the reviewing network is responsible for paying the monetary amount of the transaction if the transaction does not settle. For example, if the reviewing network guarantees settlement of a transaction for $30.00 and the transaction subsequently does not settle, the reviewing network is responsible for paying $30.00 to the acquiring bank associated with the transaction.

In some implementations, the clearing data includes a first monetary amount for a first transaction and the rules engine is further configured to detect the first monetary amount in the first one transaction, add the first monetary amount to a running total, determine that the running total exceeds a predefined threshold amount stored in the memory device, and include an error code in the clearing response data indicating that the reviewing network will not guarantee settlement at least because the running total exceeds the predefined threshold amount.

In some embodiments, in which the clearing data includes a first monetary amount for a first transaction, the rules engine compares the first monetary amount with at least one predefined reference monetary amount, determines that the first monetary amount exceeds the predefined reference monetary amount, and includes an error code in the clearing response data indicating that the reviewing network will not guarantee settlement at least because the first monetary amount exceeds the predefined reference monetary amount.

In some implementations, the clearing data includes an identification of a first bank that is one of an acquirer bank and an issuing bank associated with a first transaction and the rules engine compares the identification of the first bank with a predefined set of sanctioned banks stored in the memory device, determines that the first bank is included in the predefined set of sanctioned banks, and includes an error code in the clearing response data indicating that the reviewing network will not guarantee settlement at least because the first bank is included in the predefined set of sanctioned banks.

In some embodiments, the clearing data includes a flag indicating that a first transaction is a recurring transaction and the rules engine detects the flag associated with the first transaction, compares the first transaction with a set of recurring payment cancellation requests, and includes an error code in the clearing response data indicating that the reviewing network will not guarantee settlement at least because the first transaction is associated with a recurring payment cancellation request.

In some implementations, the clearing data includes an account number associated with a first transaction, and the rules engine compares the account number to a predefined range of authorized account numbers, determines that the account number is outside of the range, and includes an error code in the clearing response data indicating that the reviewing network will not guarantee settlement at least because the first transaction is associated with an account number that is not in the predefined range of authorized account numbers.

The rules engine, in some implementations, determines that the clearing data for a first transaction is in compliance with the set of predefined rules and transmits funds from a financial account associated with the reviewing network to an acquiring bank associated with the first transaction when the first transaction does not settle. The rules engine, in some embodiments, receives the clearing data signal including clearing data for a batch of transactions that have been processed by the originating network on behalf of a first acquiring bank and generates the clearing response data for every transaction in the batch.

The methods and systems described herein may be implemented using computer programming or engineering techniques including computer software, firmware, hardware or any combination or subset thereof, wherein the technical effect is achieved by performing at least one of: (a) receiving a clearing data signal from an originating network, the clearing data signal including clearing data for at least one transaction that has been processed by the originating network, wherein the originating network is a payment network; (b) generating a clearing response data signal including clearing response data by comparing the clearing data to a set of predefined rules stored in a memory device, wherein the clearing response data indicates that the reviewing network will not guarantee settlement of at least one transaction included in the clearing data; and (c) transmitting the clearing response data signal to the originating network. The technical effects described herein apply to the technical field of processing electronic data signals transmitted through a computer network and determining whether data in the electronic data signals comply with predefined criteria. The systems and methods described herein provide the technical advantage of enabling a first processing network to offload data-processing functions to a second processing network that is communicatively coupled to the second processing network.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an enhanced multi-party payment card industry system 120 for enabling payment-by-card transactions in which merchants and card issuers do not necessarily have a one-to-one relationship in a first payment processing network 128 ("reviewing network"), and for receiving and analyzing electronic signals transmitted from a second payment processing network 170 ("originating network"). The present disclosure relates to an enhancement of payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

The enhancement described herein enables first payment processing network 128 to receive and analyze electronic data signals from a second payment processing network 170, thereby enabling processing functions to be distributed across two networks. More specifically, and as described in more detail herein a rules engine 210 coupled to first payment processing network 128 receives clearing data signals transmitted from second payment processing network 170 and determines whether clearing data within the electronic data signals comply with a set of rules stored in memory. If the clearing data does comply with the rules, then the first payment processing network guarantees settlement of corresponding transactions represented in the clearing data. If the clearing data does not comply with the rules, the rules engine generates one or more error codes specifying why the first payment processing network 128 will not guarantee settlement of the corresponding transactions.

Figure 2:
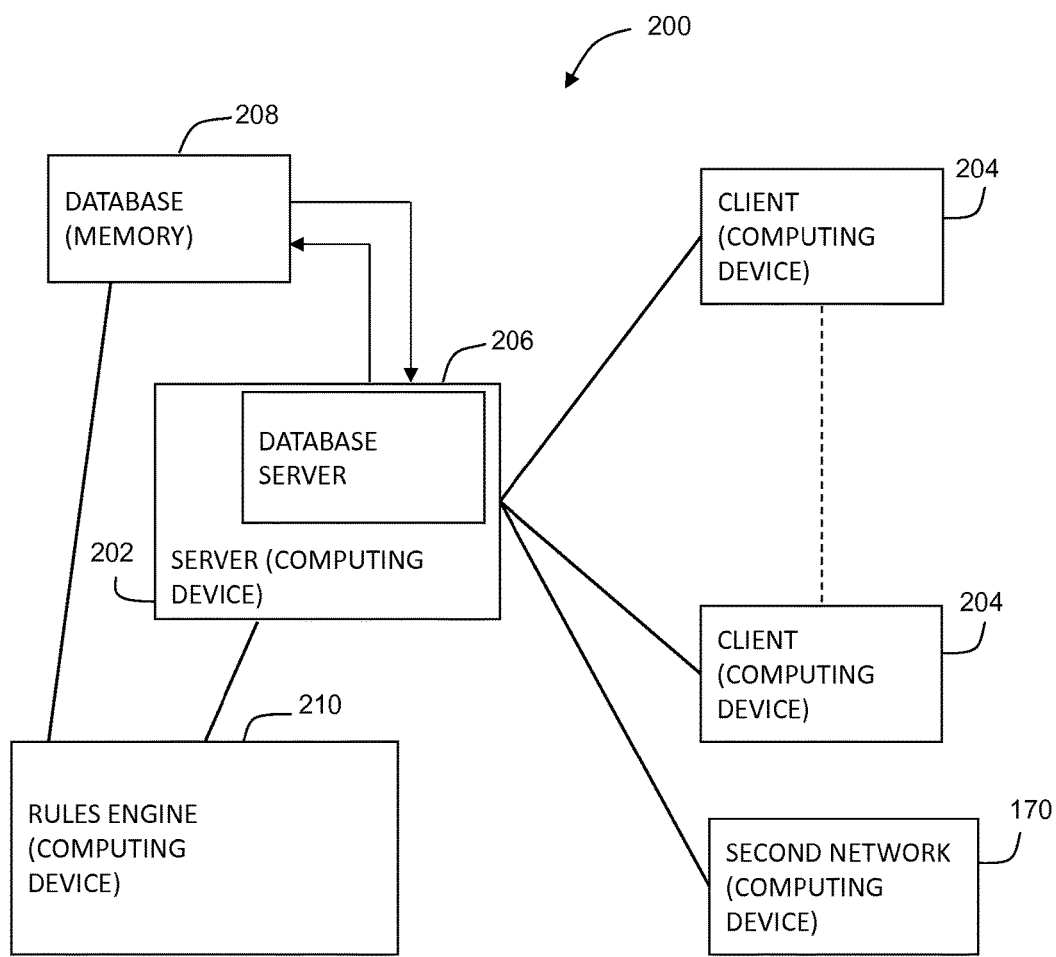

FIG. 2 is a simplified block diagram of an example payment processing system 200 in accordance with one embodiment of the present disclosure. In the example embodiment, system 200 includes a payment processing server computing device 202, a plurality of client subsystems, also referred to as client systems 204 or client computing devices, connected to payment processing server computing device 202, a computing device (i.e., also a client computing device 204) of second payment processing network 170, and a rules engine 210. As described in more detail with reference to FIG. 3, client systems 204 include computer systems of second payment processing network 170, computer systems of merchants (e.g., merchant 124), computer systems of acquirers (e.g., acquirer 126), and computer systems of one or more issuers (e.g., issuer 130). In one embodiment, client systems 204 are computers including a web browser, such that payment processing server computing device 202 and/or rules engine 210 are accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a mobile computing device, such as a notebook computer, a web-based phone, a personal digital assistant (PDA), or other web-connectable equipment.

In some embodiments, client computing device 204 includes a point-of-sale (POS) device, a cardholder computing device (e.g., a smartphone, a tablet, or other computing device), a computing device of second payment processing network 170, or any other computing device capable of communicating with payment processing server computing device 202. A database server 206 is connected to a database 208 containing information on a variety of matters, as described below in greater detail. In one embodiment database 208 is stored on payment processing server computing device 202 and may be accessed by potential users at one of client systems 204 by logging onto payment processing server computing device 202 through one of client systems 204. In any alternative embodiment, database 208 is stored remotely from payment processing server computing device 202 and may be non-centralized. In at least some implementations, as described in more detail herein, rules engine 210 stores data to, and retrieves data from, database 208.

Figure 3:
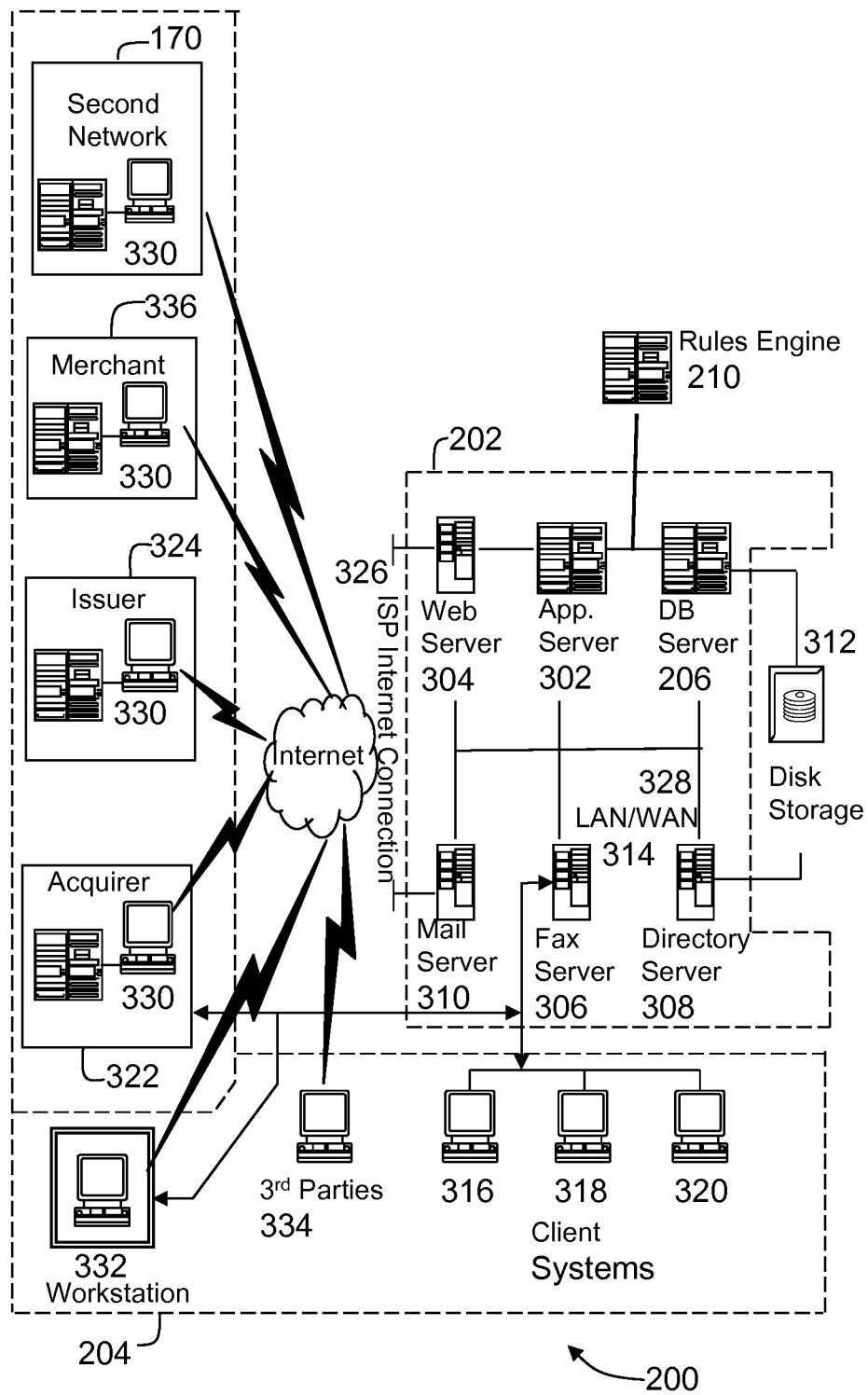

FIG. 3 is an expanded block diagram of an example embodiment of a server architecture of payment processing system 200 in accordance with one embodiment of the present disclosure. Payment processing system 200 includes payment processing server computing device 202, client systems 204, and rules engine 210. Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet. In some implementations, rules engine 210 is remote from payment processing server computing device 202 but communicatively coupled thereto. In other implementations, rules engine 210 is incorporated into payment processing server computing device 202.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Payment processing server computing device 202 is configured to be communicatively coupled to various entities, including acquirers 322, issuers 324, and to third parties 334 (e.g., auditors) and at least one computing device 204 of second payment processing network 170, using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328. As described above, in some implementations, rules engine 210 is remote from payment processing server computing device 202 but communicatively coupled thereto. In other implementations, rules engine 210 is incorporated into payment processing server computing device 202.

In the example embodiment, any authorized individual or entity having a workstation 330 may access system 200. At least one of the client systems includes a manager workstation 332 located at a remote location. Workstations 330 and 332 include personal computers having a web browser. Furthermore, fax server 306 communicates with remotely located client systems, including a client system 332, using a telephone link. Fax server 306 is configured to communicate with other client systems 316, 318, and 320 as well.

Figure 4:
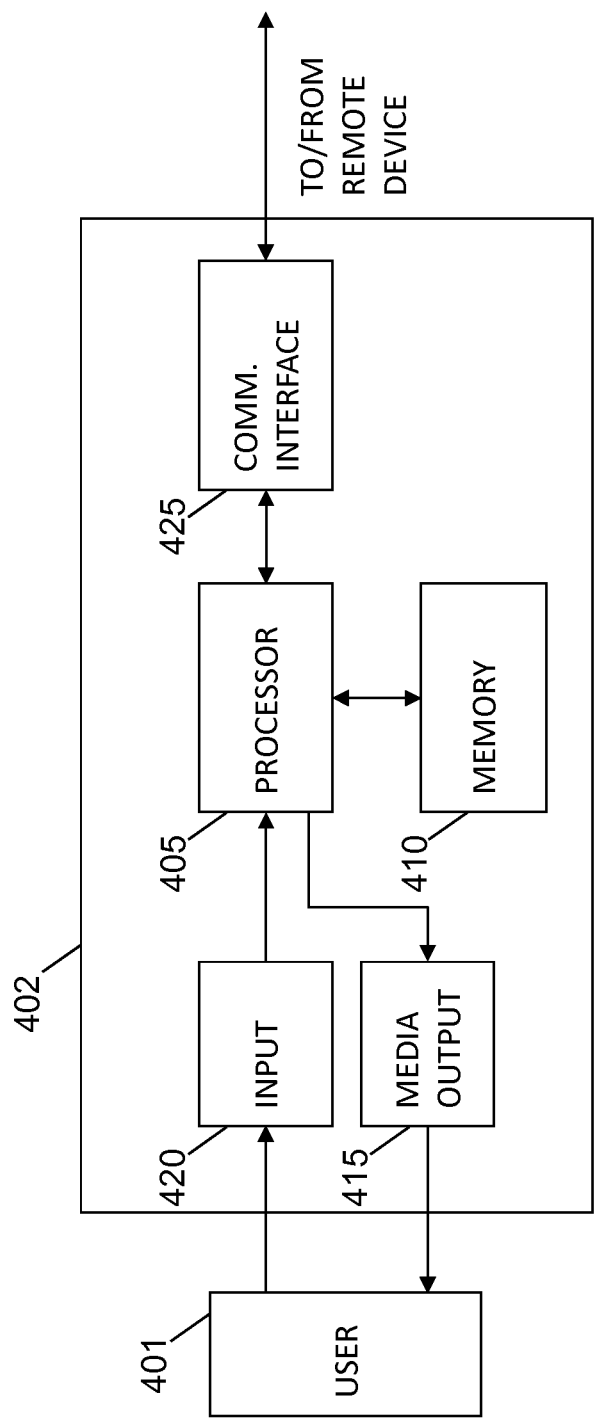

FIG. 4 illustrates an example configuration of a client computing device 402. Client computing device 402 may include, but is not limited to, client systems ("client computing devices") 204, 316, 318, 320, 330, manager workstation 332, and third party computing devices 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively coupleable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website hosted by a web server (e.g., web server 304). A client application allows users 401 to interact with an application server (e.g., application server 302).

Figure 5:
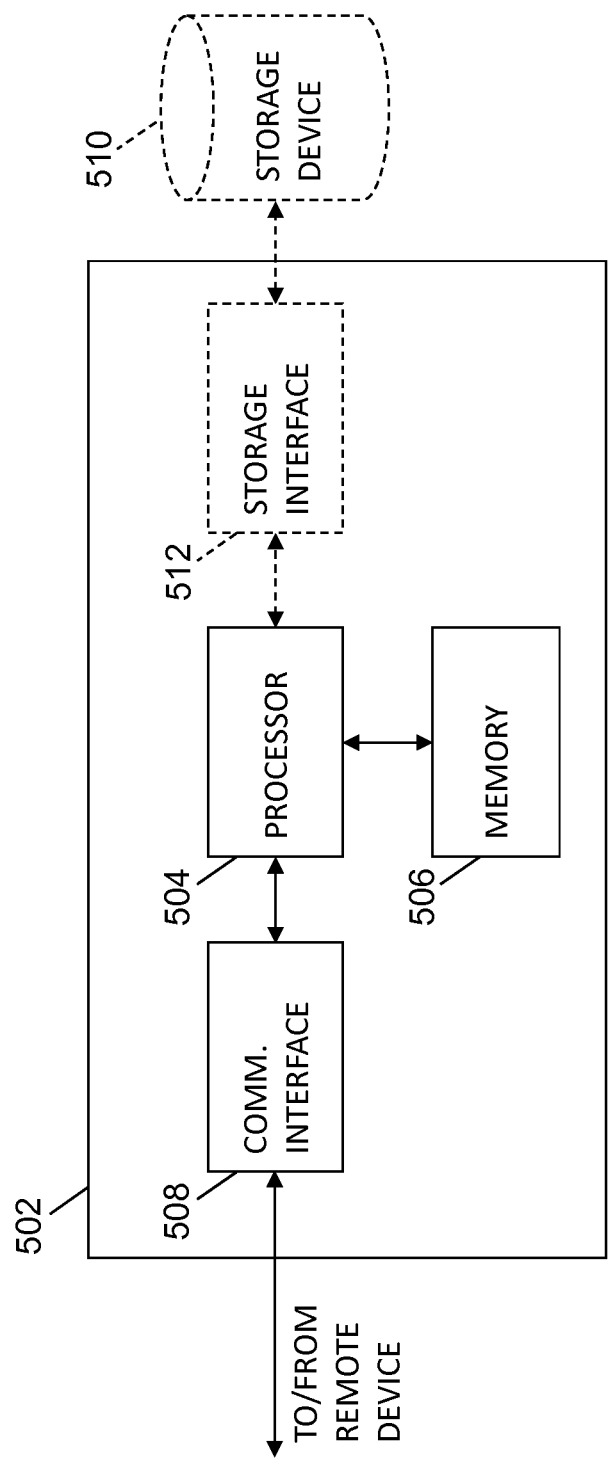

FIG. 5 illustrates an example configuration of a server computing device 502. Server computing device 502 is representative of payment processing server computing device 202 (shown in FIGS. 2 and 3), database server 206, application server 302, web server 304, fax server 306, directory server 308, mail server 310, and one or more computing devices included in rules engine 210.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
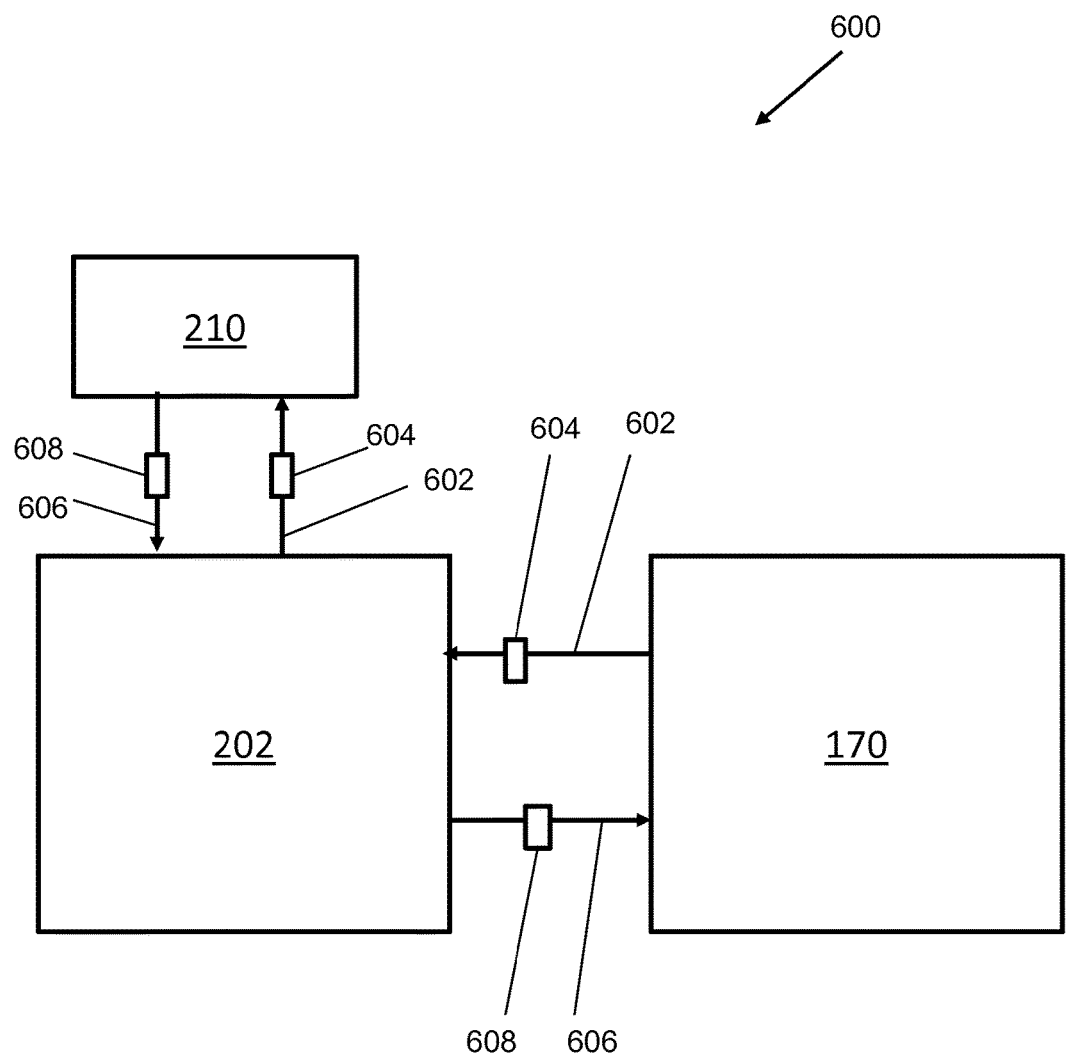

FIG. 6 is a diagram 600 of electronic data signals received and transmitted among the payment processing server computing device 202 of first payment processing network 128, the second payment processing network 170, and the rules engine 210. More specifically, second payment processing network 170 ("originating network") transmits a clearing data signal 602 to payment processing server computing device 202. Clearing data signal 602 includes clearing data 604, representing one or more transactions processed by second payment processing network 170. More specifically, clearing data 604 includes data regarding financial transactions made, for example, between merchants and cardholders, as described above with reference to FIG. 1. For certain transactions in the clearing data 604, first payment processing network 128 (the "reviewing network") will guarantee that the transaction will be settled, based information in the clearing data 604 and a set of rules applied by rules engine 210. For other transactions, first payment processing network 128 will not guarantee settlement, because one or more aspects of the transactions are not in compliance with the rules applied by rules engine 210. Payment processing server computing device 202 transmits clearing data signal 602 and clearing data 604 to rules engine 210 for analysis. As described above, in some implementations, rules engine 210 is separate from and communicatively coupled to payment processing server computing device 210 and in other implementations, rules engine 210 is incorporated into payment processing server computing device 202.

Rules engine 210 applies stored rules to clearing data 604 as described in more detail with reference to FIG. 7, and generates a clearing response data signal 606 that includes clearing response data 608. Clearing response data 608 includes identifiers of transactions for which first payment processing network 128 will not guarantee settlement and error codes identifying reasons why the settlement will not be guaranteed, as described in more detail with reference to FIG. 8. Rules engine 210 transmits clearing response data signal 606 including clearing response data 608 to second payment processing network 170. In some implementations, rules engine 210 transmits clearing response data signal 606 to second payment processing network 170 by transmitting clearing response data signal 606 to payment processing server computing device 202, which in turn, transmits clearing response data signal 606 to second payment processing network 170. In other embodiments, rules engine 210 transmits clearing response data signal 606 directly to second payment processing network 170.

Figure 7:
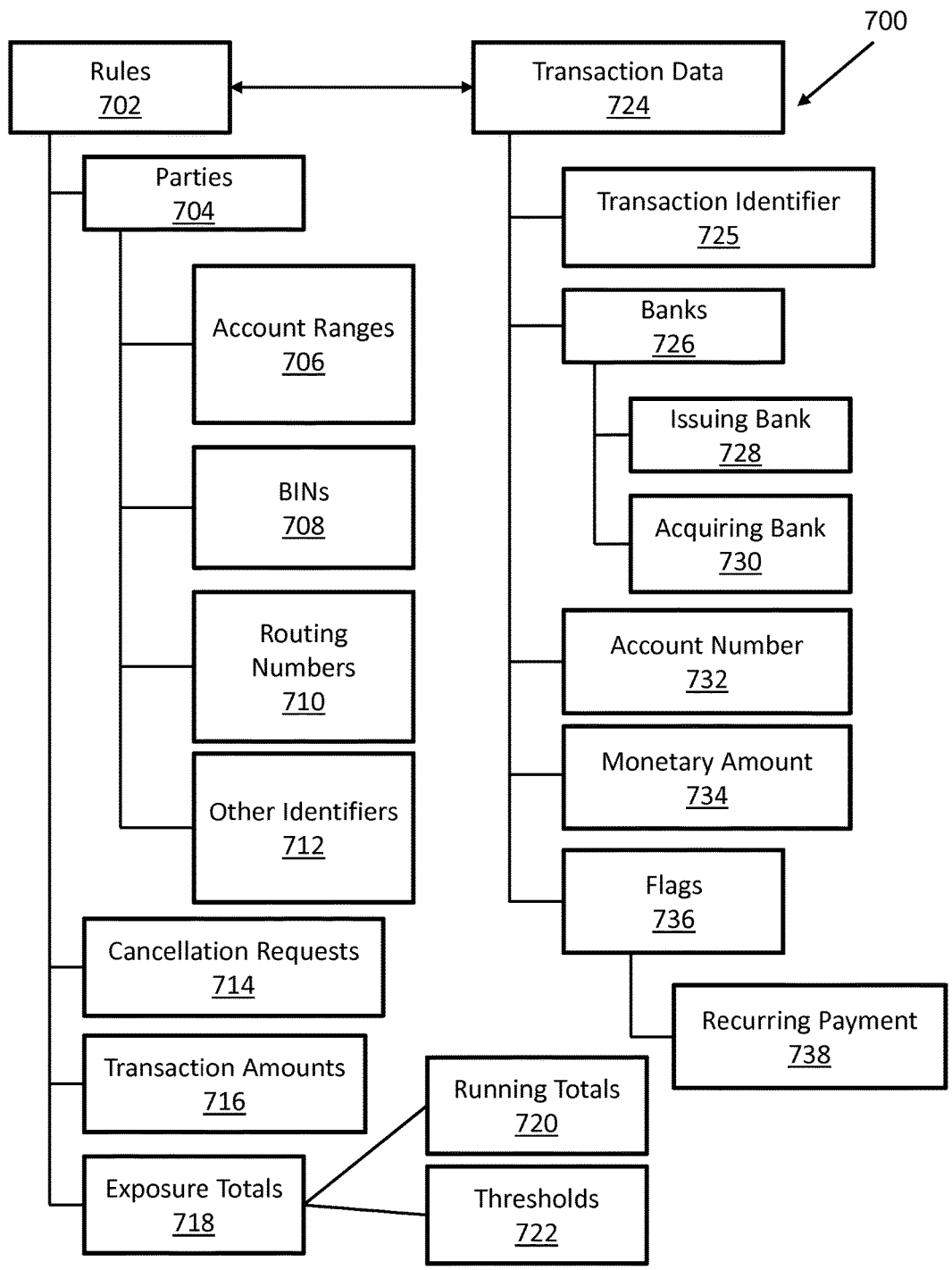

FIG. 7 is a diagram 700 including rules that the rules engine 210 applies to transaction data 724 included in clearing data 604 from the second payment processing network 170. More specifically, clearing data 604 includes transaction data 724 for one transaction or, in some implementations, a plurality of transactions (a "batch"). Rules 702 are stored in memory, for example database 208, and are accessed by rules engine 210. Rules 702 include a predefined set of parties 704 identified by account ranges 706, bank identification numbers (BINs) 708, routing numbers 710, and/or other identifiers 712 such as brand(s). For example, in some implementations, rules engine 210 detects that a bank 726, such as an issuing bank 728 or an acquiring bank 730 is identified in a transaction, for example a transaction identified in clearing data 604 by a transaction identifier 725, as a party to the transaction, and based on that identification, determines that first payment processing network 128 will not guarantee settlement of the transaction. In other implementations, rules engine 210 detects an account number 732 in the transaction data 724 and determines that the account number 732 is within account ranges 706. Upon determining that the account number 732 is included within account ranges 706, rules engine 210 determines that first payment processing network 128 will not guarantee settlement of the transaction. More specifically, the corresponding party 704 may be sanctioned under rules of a governmental entity having jurisdiction over first payment processing network 128 or may be associated with fraud or a relatively low likelihood of settlement, for example based on a history of unsuccessful settlements accessible to rules engine 210.

Rules 702 additionally include payment cancellation requests 714 received by first payment processing network 128, for example a set of requests to cancel recurring payments received from one or more cardholder computing devices 204. Rules engine 210 detects account number 732, a flag 736 indicating that the transaction is a recurring payment transaction 738, and a merchant or acquiring bank 730, and matches the transaction to a cancellation request 714 that includes account number 732 and the merchant or acquiring bank 730. Upon determining that the transaction corresponds with the cancellation request 714, rules engine 210 determines that first payment processing network 128 will not guarantee settlement of the transaction. In some implementations, rules 702 includes transaction amounts 716 (e.g., monetary amounts) that cannot be exceeded. For example, rules engine 210 detects a monetary amount 734 stored in association with transaction identifier 725 in transaction data 724 and compares monetary amount 734 to transaction amount 716. Rules engine 210 determines that monetary amount 734 is greater than transaction amount 716. Accordingly, rules engine 210 determines that first payment processing network 128 will not guarantee settlement of the transaction.

In some implementations, rules engine 210 accesses exposure totals 718 associated with one or more parties to a transaction in the clearing data 604 and determines that the party has a running total 720 of monetary amounts 734 that exceeds a threshold amount 722. In response, rules engine 210 determines that first payment processing network 128 will not guarantee settlement of the corresponding transaction.

Figure 8:
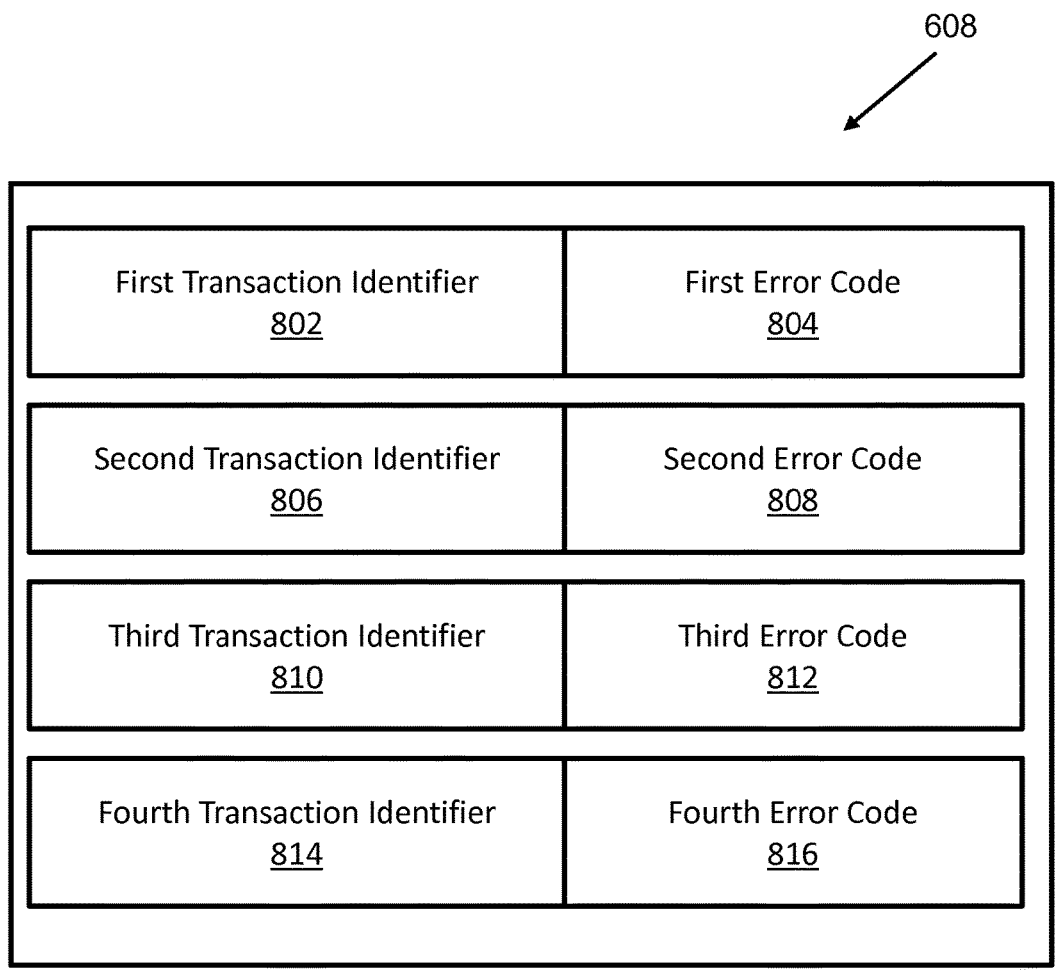

FIG. 8 is a diagram of clearing response data 608 transmitted from the rules engine 210 to the second payment processing network 170. Clearing response data 608 includes a first transaction identifier 802, for example transaction identifier 725 (FIG. 7), and a first error code 804 indicating a reason why first payment processing network will not guarantee settlement of a first transaction identified by first transaction identifier 802. First error code 804 indicates that one of parties 704 to the transaction, for example the acquiring bank 730, was present in rules 702 as a bank for which first payment processing network 128 will not guarantee settlement.

Clearing response data 608 also includes a second transaction identifier 806 associated with a second transaction that was represented in clearing data 604. Clearing response data 608 includes a second error code 808 that is associated with second transaction identifier 806. The second error code 808 indicates that the transaction was a recurring transaction for which rules 702 included a cancellation request 714. Additionally, clearing response data 608 includes a third transaction identifier 810 and an associated third error code 812. Third error code 812 indicates that the first payment processing network 128 will not guarantee settlement for the corresponding transaction because the monetary amount 734 of the transaction exceeded a transaction amount limit 716. Further, clearing response data 608 includes a fourth transaction identifier 814 and a corresponding fourth error code 816. The fourth error code 816 indicates that the first payment processing network 128 will not guarantee settlement of the corresponding transaction because the running total 720 for a party (e.g., account number 732) exceeds a threshold 722. In some implementations, clearing response data 608 only includes data (e.g., transaction identifiers and error codes) associated with transactions that the first payment processing network 128 will not guarantee settlement for. In other implementations, the clearing response data 608 includes transaction identifiers and corresponding codes for transactions that the first payment processing network 128 will guarantee settlement for.

Figure 9:
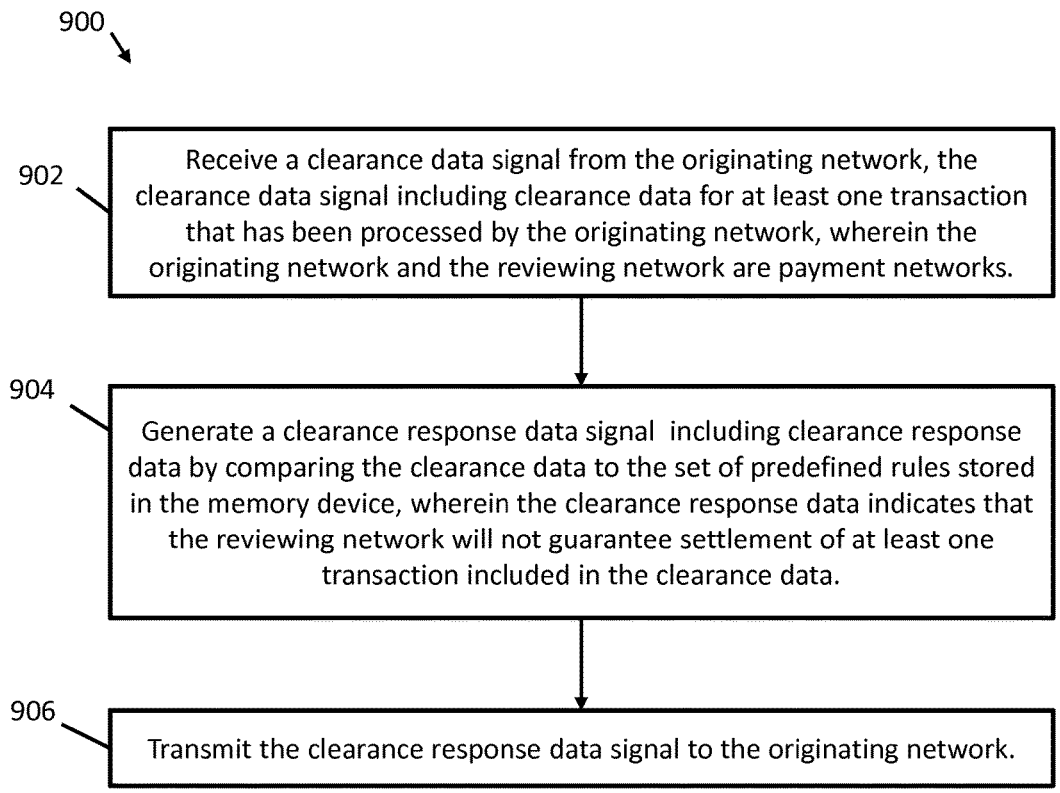

FIG. 9 is a flowchart of an example process 900 implemented by the rules 210 engine for applying rules 702 from the first payment processing network 128 to data signals (e.g., clearing data signals 602) from the second payment processing network 170. Initially, rules engine 210 receives 902 a clearing data signal (e.g., clearing data signal 602) from an originating network (e.g., second payment processing network 170). The clearing data signal 602 includes clearing data (e.g., clearing data 604) for at least one transaction that has been processed by the originating network (e.g., second payment processing network 170). The originating network (e.g., payment processing network 170) and the reviewing network (e.g., first payment processing network 128) are payment networks. Additionally, rules engine 210 generates 904 a clearing response data signal (e.g., clearing response data signal 606) that includes clearing response data (e.g., clearing response data 608) by comparing the clearing data (e.g., clearing data 604) to a set of predefined rules (e.g., rules 702) stored in a memory device (e.g., database 208). The clearing response data (e.g., clearing response data 608) indicates that the reviewing network (e.g., first payment processing network 128) will not guarantee settlement of at least one transaction included in the clearing data (e.g., clearing data 604). Further, rules engine 210 transmits 906 the clearing response data signal (e.g., clearing response data signal 606) to the originating network (e.g., second payment processing network 170).

In some implementations, the clearing data includes a first monetary amount for a first transaction, and the rules engine 210 detects the first monetary amount in the first transaction, adds the first monetary amount to a running total, determines that the running total exceeds a predefined threshold amount stored in the memory device, and includes an error code in the clearing response data indicating that the reviewing network will not guarantee settlement at least because the running total exceeds the predefined threshold amount. In some implementations, the clearing data includes a first monetary amount for a first transaction and the rules engine 210 compares the first monetary amount with at least one predefined reference monetary amount, determines that the first monetary amount exceeds the predefined reference monetary amount, and includes an error code in the clearing response data indicating that the reviewing network will not guarantee settlement at least because the first monetary amount exceeds the predefined reference monetary amount.

In some implementations, the clearing data includes an identification of a first bank that is one of an acquirer bank and an issuing bank associated with a first transaction, and the rules engine 210 compares the identification of the first bank with a predefined set of sanctioned banks stored in the memory device, determines that the first bank is included in the predefined set of sanctioned banks, and includes an error code in the clearing response data indicating that the reviewing network will not guarantee settlement at least because the first bank is included in the predefined set of sanctioned banks.

In some implementations, the clearing data includes a flag indicating that a first transaction is a recurring transaction, and the rules engine 210 detects the flag associated with the first transaction, compares the first transaction with a set of recurring payment cancellation requests, and includes an error code in the clearing response data indicating that the reviewing network will not guarantee settlement at least because the first transaction is associated with a recurring payment cancellation request. In some implementations, the clearing data includes an account number associated with a first transaction, and the rules engine 210 compares the account number to a predefined range of authorized account numbers, determines that the account number is outside of the range, and includes an error code in the clearing response data indicating that the reviewing network will not guarantee settlement at least because the first transaction is associated with an account number that is not in the predefined range of authorized account numbers.

In some implementations, the rules engine 210 determines that the clearing data for a first transaction is in compliance with the set of predefined rules and transmits funds from a financial account associated with the reviewing network to an acquiring bank associated with the first transaction when the first transaction does not settle. In some implementations, the rules engine 210 receives the clearing data signal including clearing data for a batch of transactions that have been processed by the originating network on behalf of a first acquiring bank and generates the clearing response data for every transaction in the batch.

Figure 10:
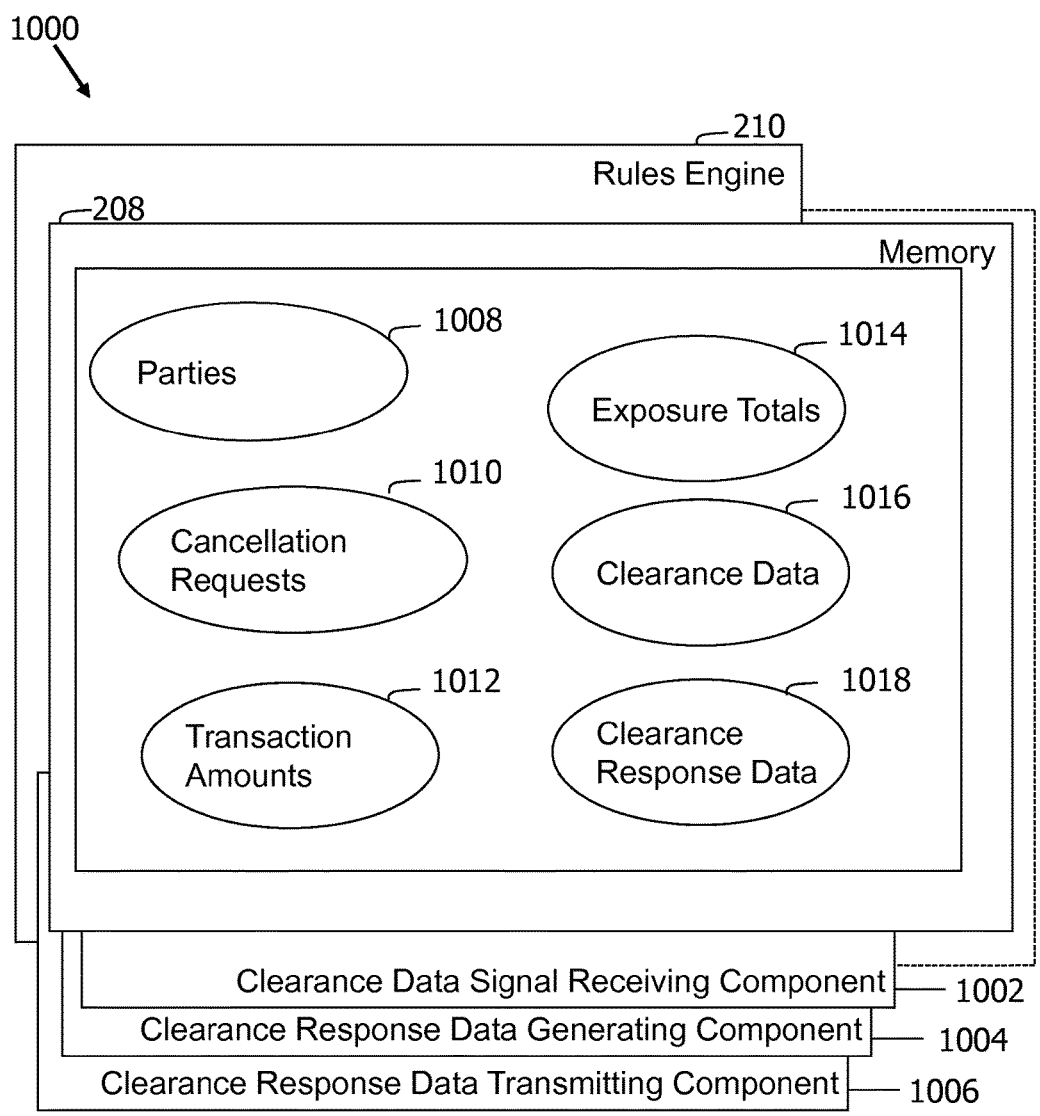

FIG. 10 is a diagram 1000 of components of one or more example computing devices, for example rules engine 210, that may be used in embodiments of the described systems and methods. FIG. 10 further shows a configuration of data in database 208. Database 208 is in communication with several separate components within rules engine 210, which perform specific tasks.

Rules engine 210 includes a clearing data signal receiving component 1002 that receives a clearing data signal from the originating network. The clearing data signal includes clearing data for at least one transaction that has been processed by the originating network. Additionally, rules engine 210 includes a clearing response data generating component 1004 that generates a clearing response data signal that includes clearing response data. More specifically, clearing response data generating component 1004 compares the clearing data to the set of predefined rules stored in the memory device (e.g., database 208). The clearing response data indicates that the reviewing network will not guarantee settlement of at least one transaction included in the clearing data. Further, rules engine 210 includes a clearing response data transmitting component 1006 that transmits the clearing response data signal to the originating network.

In an example embodiment, data in database 208 is divided into a plurality of sections, including but not limited to, a parties section 1008, a cancellation requests section 1010, a transaction amount section 1012, an exposure totals section 1014, a clearing data section 1016, and a clearing response data section 1018. These sections stored in database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described systems and methods enable distributed evaluation of data across two payment networks. More specifically, the systems and methods described herein provide settlement guarantee on a risk-sensitive basis when a second network operates with a first network manage one or more payment processing functions, for example clearing of transactions. Accordingly, the systems and methods described herein enable the first network to evaluate clearing transactions from the second network prior to settlement being effected.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A rules engine for applying rules from a reviewing network to data signals from an originating network, said rules engine comprises a processor coupled to a memory device, said rules engine is coupled to the reviewing network, said rules engine is configured to:
receive a clearing data signal from the originating network, the clearing data signal including clearing data for a first transaction that has been processed by the originating network, wherein the originating network and the reviewing network are payment networks;
generate a clearing response data signal including clearing response data by comparing the clearing data to a set of predefined rules stored in said memory device, wherein the clearing response data indicates that the reviewing network will guarantee settlement of the first transaction included in the clearing data;
transmit the clearing response data signal to the originating network; and
transmit funds from a financial account associated with the reviewing network to an acquiring bank associated with the first transaction after the first transaction does not settle on the originating network.

2. The rules engine of claim 1, wherein the clearing data includes a first monetary amount for a second transaction, the rules engine further configured to:
detect the first monetary amount in the second transaction;
add the first monetary amount to a running total;
determine that the running total exceeds a predefined threshold amount stored in said memory device; and
include an error code in the clearing response data indicating that the reviewing network will not guarantee settlement of the second transaction, at least because the running total exceeds the predefined threshold amount.

3. The rules engine of claim 1, wherein the clearing data includes a first monetary amount for a second transaction, said rules engine is further configured to:
compare the first monetary amount with at least one predefined reference monetary amount;
determine that the first monetary amount exceeds the predefined reference monetary amount; and
include an error code in the clearing response data indicating that the reviewing network will not guarantee settlement of the second transaction, at least because the first monetary amount exceeds the predefined reference monetary amount.

4. The rules engine of claim 1, wherein the clearing data includes an identification of a first bank that is one of an acquirer bank and an issuing bank associated with a second transaction, said rules engine is further configured to:
compare the identification of the first bank with a predefined set of sanctioned banks stored in said memory device;
determine that the first bank is included in the predefined set of sanctioned banks; and
include an error code in the clearing response data indicating that the reviewing network will not guarantee settlement of the second transaction, at least because the first bank is included in the predefined set of sanctioned banks.

5. The rules engine of claim 1, wherein the clearing data includes a flag indicating that a second transaction is a recurring transaction, said rules engine is further configured to:
detect the flag associated with the second transaction;
compare the second transaction with a set of recurring payment cancellation requests;
and include an error code in the clearing response data indicating that the reviewing network will not guarantee settlement of the second transaction, at least because the second transaction is associated with a recurring payment cancellation request.

6. The rules engine of claim 1, wherein the clearing data includes an account number associated with a second transaction, said rules engine is further configured to:
compare the account number to a predefined range of authorized account numbers;
determine that the account number is outside of the predefined range of authorized account numbers; and
include an error code in the clearing response data indicating that the reviewing network will not guarantee settlement of the second transaction, at least because the second transaction is associated with an account number that is not in the predefined range of authorized account numbers.

7. The rules engine of claim 1, further configured to:
receive the clearing data signal including clearing data for a batch of transactions that have been processed by the originating network on behalf of a first acquiring bank; and
generate the clearing response data for every transaction in the batch of transactions.

8. A method for applying rules from a reviewing network to data signals from an originating network, said method is implemented by a rules engine including a processor coupled to a memory device and to a payment network, said method comprising:
receiving, by the rules engine, a clearing data signal from the originating network, the clearing data signal including clearing data for a first transaction that has been processed by the originating network, wherein the originating network and the reviewing network are payment networks;
generating, by the rules engine, a clearing response data signal including clearing response data by comparing the clearing data to a set of predefined rules stored in the memory device, wherein the clearing response data indicates that the reviewing network will guarantee settlement of the first transaction included in the clearing data;
transmitting, by the rules engine, the clearing response data signal to the originating network; and
transmitting funds from a financial account associated with the reviewing network to an acquiring bank associated with the first transaction after the first transaction does not settle on the originating network.

9. The method of claim 8, wherein the clearing data includes a first monetary amount for a second transaction, said method further comprising:
detecting the first monetary amount in the second transaction;
adding the first monetary amount to a running total;
determining that the running total exceeds a predefined threshold amount stored in the memory device; and
including an error code in the clearing response data indicating that the reviewing network will not guarantee settlement of the second transaction, at least because the running total exceeds the predefined threshold amount.

10. The method of claim 8, wherein the clearing data includes a first monetary amount for a second transaction, said method further comprising:
comparing the first monetary amount with at least one predefined reference monetary amount;
determining that the first monetary amount exceeds the predefined reference monetary amount; and
including an error code in the clearing response data indicating that the reviewing network will not guarantee settlement of the second transaction, at least because the first monetary amount exceeds the predefined reference monetary amount.

11. The method of claim 8, wherein the clearing data includes an identification of a first bank that is one of an acquirer bank and an issuing bank associated with a second transaction, said method further comprising:
comparing the identification of the first bank with a predefined set of sanctioned banks stored in the memory device;
determining that the first bank is included in the predefined set of sanctioned banks; and
including an error code in the clearing response data indicating that the reviewing network will not guarantee settlement of the second transaction, at least because the first bank is included in the predefined set of sanctioned banks.

12. The method of claim 8, wherein the clearing data includes a flag indicating that a second transaction is a recurring transaction, said method further comprising:
detecting the flag associated with the first transaction;
comparing the second transaction with a set of recurring payment cancellation requests; and including an error code in the clearing response data indicating that the reviewing network will not guarantee settlement of the second transaction, at least because the first transaction is associated with a recurring payment cancellation request.

13. The method of claim 8, wherein the clearing data includes an account number associated with a second transaction, said method further comprising:
comparing the account number to a predefined range of authorized account numbers;
determining that the account number is outside of the predefined range of authorized account numbers; and
including an error code in the clearing response data indicating that the reviewing network will not guarantee settlement of the second transaction, at least because the second transaction is associated with an account number that is not in the predefined range of authorized account numbers.

14. The method of claim 8, further comprising:
receiving the clearing data signal including clearing data for a batch of transactions that have been processed by the originating network on behalf of a first acquiring bank; and
generating the clearing response data for every transaction in the batch of transactions.

15. A non-transitory computer-readable storage medium having computer-executable instructions embodied thereon for applying rules from a reviewing network to data signals from an originating network, wherein when executed by a rules engine including a processor coupled to a memory device and to a processing network, the computer-executable instructions cause the rules engine to:
receive a clearing data signal from the originating network, the clearing data signal including clearing data for a first transaction that has been processed by the originating network, wherein the originating network and the reviewing network are payment networks;
generate a clearing response data signal including clearing response data by comparing the clearing data to a set of predefined rules stored in the memory device, wherein the clearing response data indicates that the reviewing network will guarantee settlement of the first transaction included in the clearing data;
transmit the clearing response data signal to the originating network; and
transmit funds from a financial account associated with the reviewing network to an acquiring bank associated with the first transaction after the first transaction does not settle on the originating network.

16. The non-transitory computer-readable storage medium of claim 15, wherein the clearing data includes a first monetary amount for a second transaction and said computer-executable instructions additionally cause the rules engine to:
detect the first monetary amount in the second transaction;
add the first monetary amount to a running total;
determine that the running total exceeds a predefined threshold amount stored in the memory device; and
include an error code in the clearing response data indicating that the reviewing network will not guarantee settlement of the second transaction, at least because the running total exceeds the predefined threshold amount.

17. The non-transitory computer-readable storage medium of claim 15, wherein the clearing data includes a first monetary amount for a second transaction and said computer-executable instructions additionally cause the rules engine to:
compare the first monetary amount with at least one predefined reference monetary amount;
determine that the first monetary amount exceeds the predefined reference monetary amount; and
include an error code in the clearing response data indicating that the reviewing network will not guarantee settlement of the second transaction, at least because the first monetary amount exceeds the predefined reference monetary amount.

18. The non-transitory computer-readable storage medium of claim 15, wherein the clearing data includes an identification of a first bank that is one of an acquirer bank and an issuing bank associated with a second transaction, and said computer-executable instructions additionally cause the rules engine to:
compare the identification of the first bank with a predefined set of sanctioned banks stored in the memory device;
determine that the first bank is included in the predefined set of sanctioned banks; and
include an error code in the clearing response data indicating that the reviewing network will not guarantee settlement of the second transaction, at least because the first bank is included in the predefined set of sanctioned banks.

* * * * *